Feb. 23, 1971     H. J. GILMOURE ET AL     3,564,742
TIRE SUPPORTED SIGNBOARD
Filed June 12, 1968
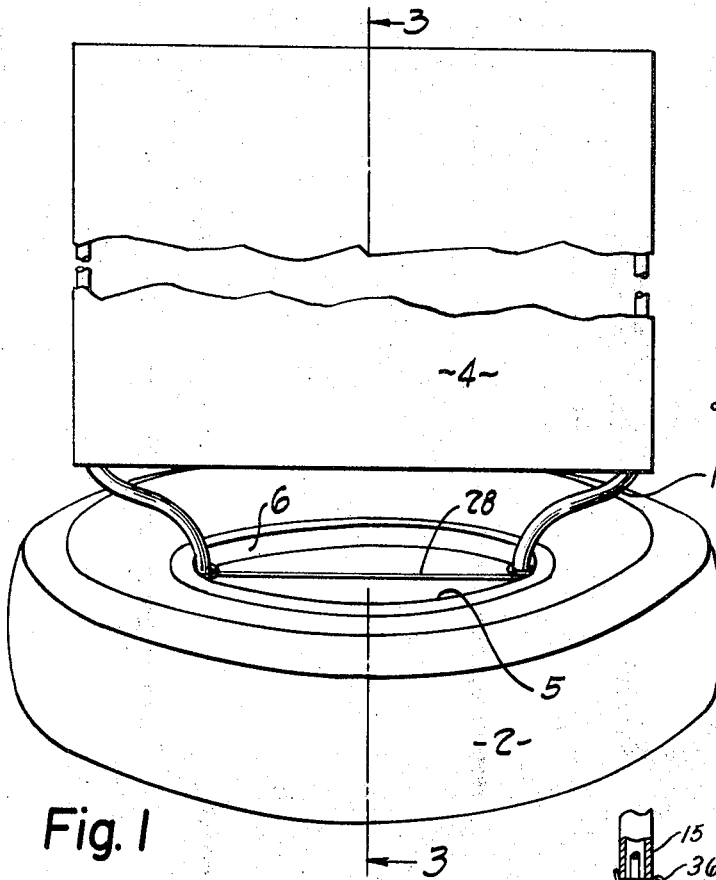
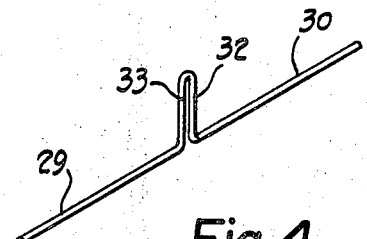
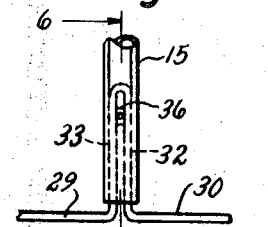
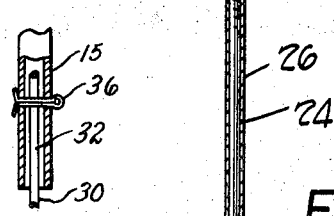
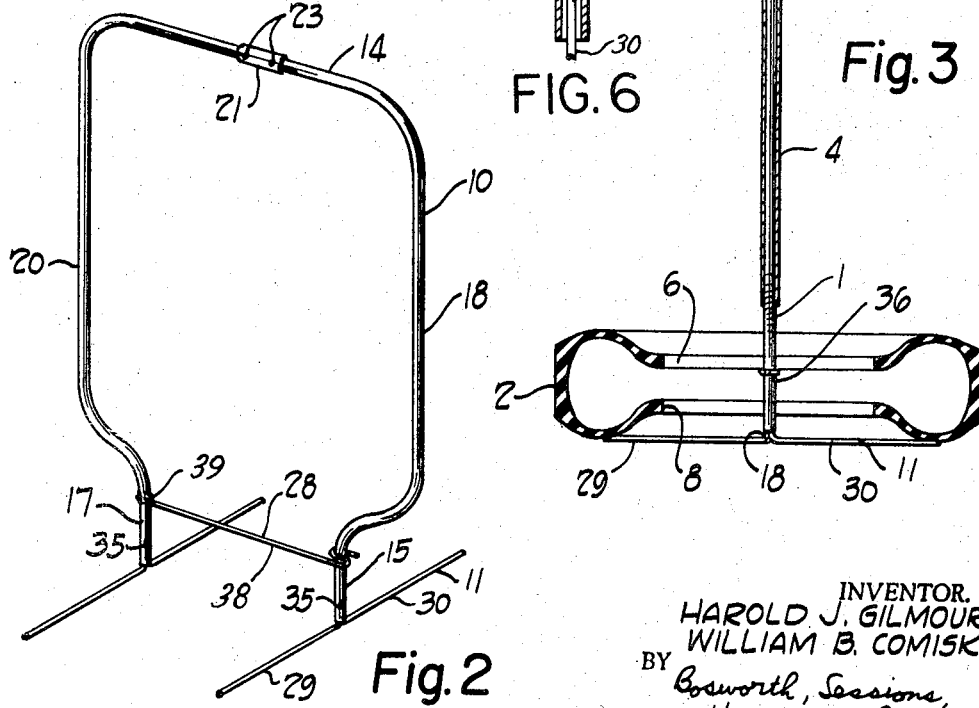
INVENTOR.
HAROLD J. GILMOURE
WILLIAM B. COMISKEY
BY Bosworth, Sessions, Herrstrom Cain
ATTORNEYS.

United States Patent Office 3,564,742
Patented Feb. 23, 1971

3,564,742
TIRE SUPPORTED SIGNBOARD
Harold J. Gilmoure, Shaker Heights, and William B. Comiskey, University Heights, Ohio, assignors to Sales Promotions Products, Inc., Cleveland, Ohio
Filed June 12, 1968, Ser. No. 736,333
Int. Cl. G09f 7/00, 1/14
U.S. Cl. 40—125
14 Claims

ABSTRACT OF THE DISCLOSURE

A planar signboard frame made of tubing, and the like, and supported on a tire and including a two-sided sign with a pocket having a sliding fit over the frame.

BACKGROUND OF THE INVENTION

Field of the invention

This invention relates to tire supported signboards.

Description of the prior art

Signboards or poster and sign mounting devices which are held within or under or supported by an ordinary automobile tire, or the like, are old and known in the art. Such boards have been supported on or within the wheel opening of tires, which stand vertically or on edge, and are held in that position by a suitable stand, and of tires which lie horizontal on the ground or supporting surface.

Since ordinary automobile tires (both used and new) are commonly found around service stations, garages, and the like, signs relating to the activities of the particular business and the products and services it has for sale and supported against upsetting by wind and other forces by tires seem to be a logical adaptation and use of the tires. This is especially so when the signs, as is frequently the situation, advertise the sale of tires.

In fact simple, flat circular signs for mounting within the central wheel opening of a tire have been widely used for advertising the sale of tires. Such signs have the disadvantage however, that they are limited in size to the wheel opening and/or by the fact that the supporting tire must be on edge or vertical. This latter fact requires a separate holding device to maintain the tire in an upright position.

Vertical signboards supported on and in a horizontally disposed tire have also been used in the prior art. They have the advantage of larger size, since their height and exposed width are usually independent of the wheel opening diameter, and of obviating the need of stands, or other tires or apparatus, for supporting the tire in a vertical position.

Nonetheless, despite their obvious appeal and utility in certain environments, signboards for use in and with and to be supported by and in coaction with a tire and, in particular, a tire lying horizontal on the ground, driveway or other surface, have not come into widespread use nor been commercially adopted on the scale and in the manner to be expected.

Since the tires are available and of "standard" design and size, it follows that the signboards themselves, in their own structure, per se, and in the structure by which they coact and cooperate with the tire to provide a unitary or functional whole, have been insufficient and inadequate in a very real sense.

SUMMARY OF INVENTION

The general object of this invention is to provide a new and improved tire supported signboard.

Another object of this invention is to provide a new and improved tire supported signboard which is planar, supported upright and holds or supports a removable and replaceable two-sided, sleeve like sign which slidably engages over the signboard frame.

Other objects of this invention include the provision of a new and improved planar signboard which is supported by and perpendicular to a tire and the provision of such a signboard which is easily and economically manufactured and used; which is easily disassembled for ease of storage and handling; which is effective and efficient in operation and use; which has no structure which interferes with or adversely affects the visual effects of the sign mounted thereon; and which is adapted for use with and holds and supports a removable and replaceable two-sided sign having a sleeve like construction which surrounds and entirely or substantially covers the signboard frame structure.

A still further object of this invention is to provide a new and improved signboard and sign which is efficient and effective in use; which is easly and economically manufactured and used; which is of simple and effective structure; and which has a new and improved coaction between the sign and signboard and between the signboard and a tire with which it is adapted for use for obtaining the objects and advantages of this invention.

A still further object of this invention is to provide a new and improved tire supported, planar signboard, and combination thereof obtaining one or more of the objects and advantages set forth above.

These and other objects and advantages of this invention will become apparent from the following description of preferred forms thereof, reference being had to the accompanying drawing.

BRIEF DESCRIPTION OF THE DRAWINGS

FIG. 1 is a broken front view of a supporting tire, sign and signboard embodying a preferred form of this invention;

FIG. 2 is a perspective view of the signboard shown in FIG. 1;

FIG. 3 is a vertical section of the tire, signboard and sign shown in FIG. 1 viewed along the line 3—3 of FIG. 1;

FIG. 4 is a perspective view of the signboard support member;

FIG. 5 is a broken elevation showing the interconnection between the vertical frame member and a horizontal foot member; and FIG. 6 is a vertical section viewed along the line 6—6 of FIG. 5.

DESCRIPTION OF PREFERRED EMBODIMENTS

A signboard, supporting tire and sign embodying a preferred form of this invention are indicated at 1, 2 and 4, respectively, in FIG. 1.

Tire 2 is, as indicated above, conventionally a used automobile tire of standard construction having a standard wheel opening 5 and upper and lower beads, or lips, 6 and 8, respectively, FIG. 3, albeit tire 2 may be formed of other materials and shapes provided it has a central opening and sufficient size and weight to function in the manner to be hereinafter described.

Signboard 1 comprises an upright frame member 10 and at least one transverse support or foot member 11, FIGS. 2, 3 and 4.

Frame 10 and sign 4 are so related and constructed that the frame is disposed in a single plane, of finite thickness however, and is within and substantially covered by the sign 4 which, in turn, has two faces or sides each carrying an advertisement or message so that the same is visible to persons and traffic approaching from either direction. Further, the frame 10 and sign 4 are so related and constructed that the sign 4 may be removed and replaced or another sign substituted with a minimum of effort and time.

To these ends, frame 10 preferably is a generally U-shaped member having a closed loop or horizontal portion 14 at its upper end, as viewed and used, and two parallel legs 15 and 17 which are spaced apart at their lower ends a distance substantially equal to the opening 5 in the tire or support means 2.

Frame 10 has a close, sliding fit with the sign 4, so that it will hold the sign taut and as free from wrinkles as reasonably possible, to facilitate reading of the message when it is disposed within the sign 4.

Accordingly, the length, of loop 14 and the distance between the portions 18 and 20 of legs 15 and 17, respectively, which are to be disposed within the sign, is substantially equal to the opening within the sign. Usually the sign will be of greater width than distance across the opening 5 within which the lower ends of the legs 15 and 17 are disposed during use and when this is so, or, if the sign is of less width than the aforesaid distance across the opening 5, the legs 15 and 17 are bent and shaped in the manner shown to extend outwardly over the tire or support, or inwardly toward the center thereof, if necessary.

Further, for convenience in manufacture and shipping, frame 10 may be made of two similar halves which are coupled together midway of the loop or horizontal portion 14 by suitable means such as tubular coupling 21, which slides over the adjacent ends of the two halves of frame 10 and is held in place, on each half, by suitable set screws 23.

Sign 4 is preferably flexible and is made of any suitable material, such as cloth, canvas, paper, and the like. Sign 4 comprises two flat panel members 24 and 26, FIG. 3 which are disposed in overlying position, with their "message" sides facing outwardly and are then sewed or otherwise joined together along the periphery of their sides and top to form an envelope or sleeve-like member having one side, the lower as viewed, open to receive the frame 10 of signboard 1 so that the sign may be slipped thereover (or the frame slid therein), the fit being sufficiently tight, as pointed out above, so that the sign is maintained taut.

Alternatively, sign 4 may be formed of a single piece of material folded in half with the fold forming one edge of the completed sign and with the edges along two of sides being sewed or adhered together to complete the envelope.

Signboard 1 is supported within tire 2, so as to remain upright or perpendicular to the tire even when the sign is subjected to wind and other forces tending to bend or tip the signboard over, about a transverse axis and independent of the tire 2. To this end, each leg 15 and 17 is engaged and is supported on and by a transverse support 11. Each foot member 11 preferably extends in both directions perpendicular to the plane of frame 10 and beneath the tire 2 which rests thereupon and the legs 15 and 17 themselves are spread apart, adjacent the tire 2, by suitable brace means 28 to ensure contact with diametric portions of the tire beads, or lips, 6 and 8.

More particularly, when, as preferred, frame 10 is formed of a hollow tubular material, such as metal, the transverse support or foot member 11 preferably comprises horizontal end portions 29 and 30, FIGS. 2, 3 and 4, and a central vertical portion 32, which is adapted to slide within the tubular leg 15 or 17 with which the particular transverse support is associated. Also, in order to retain the transverse support in position in and on the frame leg, vertical portion 32, of transverse support 11 is preferably formed with a loop or aperture 33, and corresponding apertures, or holes 35, are drilled or otherwise formed in the legs 15 and 17, respectively, and suitable fastening means, such as cotter pin 36, FIGS. 3, 5 and 6, is inserted through the apertures 33 and 35.

Transverse supports 11 are preferably and conveniently formed of metal wire, bent and shaped as shown.

Brace means, or extension bar 28, preferably comprises a straight, rigid central portion 38 with a loop or aperture 39 at each end which is of sufficient diameter to be easily slid over the ends of the legs 15 and 17, respectively, and is held in position on the legs 15 and 17 by resting upon or above the fastening means 36. Brace means 28 holds the lower ends of legs 15 and 17 apart and so not only prevents their collapsing together but also preferably maintains them in respective engagement with the tire 2. Brace means 28 also is preferably and conveniently formed of bent and shaped metal wire.

In use, the frame 10 is assembled, if in two parts, by means of coupling 21, extension bar 28 is slid over the lower, open ends of legs 15 and 17, respectively, and the legs are inserted into the wheel opening 5 of an ordinary automobile tire 2, a transverse support 11 is positioned within the hollow end of each leg 15 and 17 and the cotter pins pushed through the respective apertures 35 and 33 and opened. The signboard 1 and, in particular, the frame 10, is then ready and in position to receive the sign 4, which is easily positioned simply by sliding the open end of the sign over the frame 10 and pulling it all the way on. The resulting sign is practical, efficient and presents an attractive appearance, yet the message itself is easily and readily changed or replaced when and as desired.

Modifications, changes and improvements to the preferred forms of the invention herein particularly disclosed and described may occur to those skilled on the art who come to understand the principles and precepts thereof. Accordingly, the scope of the patent issued hereon should not be limited to the specific forms of the invention herein particularly illustrated, disclosed and described but only consistent with the advance by which the invention has promoted the art.

I claim:

1. An advertising sign, and the like, comprising tire means having an opening therein, a signboard supported thereby, and sign means mounted on said signboard, said sign means comprising a two-faced sleeve-like member having a hollow interior with one edge open for the reception of said signboard, said signboard comprising a planar upright frame having a close sliding fit within said sign means and holding said sign means taut when said sign means is positioned thereover, said sign means being removably slid over and upon said frame, said frame having two legs spaced apart and extending into said tire means opening, and transverse support means carried on said frame, said transverse support means extending transversely of the plane of said frame and underlying at least a portion of said tire means, said tire means resting on and engaging said transverse support means.

2. The advertising sign according to claim 1 in which said sign means comprises a flexible, sheet material formed as a flat member having a hollow interior and an opening on one side into said interior.

3. The advertising sign according to claim 1 in which said transverse support means comprises two parallel spaced-apart transverse supports each of which engages and supports a said leg and extends in both directions therefrom.

4. The advertising sign according to claim 3 in which said frame comprises a bent and shaped hollow tubular member, each said transverse support comprises a first portion extending perpendicular to said leg which it supports and a second portion extending into said leg, an aperture in said second portion and fastening means extending through said leg and said aperture of said second portion and retaining said transverse support in said leg.

5. The advertising sign according to claim 4 in which each said transverse support comprises a bent and shaped wire member having an upright loop formed intermediate its length, said loop fitting within said leg.

6. The advertising sign according to claim 5 with brace means engaging and extending between said legs and urging and holding said legs apart and into engagement with said tire means, said brace means comprising a bent and shaped wire member having a straight central portion and an aperture at each end having sliding engagement over a said leg, respectively.

7. The advertising sign according to claim 1 with brace means engaging and extending between said legs and urging said legs apart and into engagement with said tire means.

8. An advertising sign, and the like, comprising tire means having an opening therein, a signboard supported thereby, and sign means mounted on said signboard, said signboard comprising a planar upright frame having two legs spaced apart and extending into said tire means opening, brace means engaging said legs respectively and holding said legs apart and transverse support means carried on said frame, said transverse support means extending transversely of the plane of said frame and underlying at least a portion of said tire means, said tire means resting on and engaging said transverse support means.

9. The advertising sign according to claim 8 in which said brace means comprises a bent and shaped wire member having a straight central portion and an aperture at each end having sliding engagement over a said leg, respectively.

10. The advertising sign according to claim 8 in which said transverse support means comprises two parallel spaced-apart transverse supports each of which engages and supports a said leg and extends in both directions therefrom.

11. The advertising sign according to claim 10 in which said frame comprises a bent and shaped hollow tubular member, each said transverse support comprises a first portion extending perpendicular to said leg which it supports and a second portion extending into said leg, an aperture in said second portion and fastening means extending through said leg and said aperture of said second portion and retaining said transverse support in said leg.

12. The advertising sign according to claim 11 in which each said transverse support comprises a bent and shaped wire member having an upright loop formed intermediate its length, said loop fitting within said leg.

13. A support for an advertising sign, and the like, comprising an upright, generally U-shaped, planar frame member having two parallel spaced-apart legs, brace means extending between and engaging said legs and holding them apart, and horizontal support means engaging and supporting each said leg and extending transversely, outwardly from the plane of said frame member in which said legs have open tubular ends and each said horizontal support means comprises a first portion extending perpendicularly to the legs which it supports and a second portion extending into said leg, an aperture in said second portion and fastening means extending through said leg and said aperture of said second portion and retaining said horizontal support in said leg.

14. The advertising sign support according to claim 13 with sign means mounted on said frame member, said sign means comprising a two-faced sleeve-like member having a hollow interior with one edge open for the reception of said frame member, said frame member having a close sliding fit within said sleeve member and holding the sleeve member taut when positioned therein.

References Cited

UNITED STATES PATENTS

| | | | |
|---|---|---|---|
| 2,064,047 | 12/1936 | Wertz | 40—125X(H) |
| 2,180,125 | 11/1939 | Smith | 40—125(G) |
| 2,267,529 | 12/1941 | Leech | 40—125(M) |
| 2,333,302 | 11/1943 | Enk | 40—10(C) |
| 3,239,957 | 3/1966 | Snediker | 40—125X(G) |
| 1,635,394 | 7/1927 | Anderson | 40—125(H) |
| 1,887,894 | 11/1932 | Schwab | 40—125(H) |
| 2,064,127 | 12/1936 | Schneider | 40—125(H) |
| 2,559,106 | 7/1951 | Bishop et al. | 40—125(H) |

FOREIGN PATENTS

| | | | |
|---|---|---|---|
| 704,578 | 3/1965 | Canada | 40—125H |

ROBERT W. MICHELL, Primary Examiner

R. CARTER, Assistant Examiner